United States Patent
Young et al.

(10) Patent No.: US 11,240,038 B2
(45) Date of Patent: Feb. 1, 2022

(54) LEDGER-BASED CONFIDENCE MODEL FOR CONTENT TRANSFERS ACROSS A COMMUNICATION NETWORK

(71) Applicant: Avaya Inc., Santa Clara, CA (US)

(72) Inventors: John Young, Buntingford (GB); David Chavez, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 341 days.

(21) Appl. No.: 16/354,340

(22) Filed: Mar. 15, 2019

(65) Prior Publication Data
US 2020/0295947 A1 Sep. 17, 2020

(51) Int. Cl.
*H04L 9/32* (2006.01)
*H04L 12/26* (2006.01)
*H04L 29/06* (2006.01)
*H04L 29/08* (2006.01)

(52) U.S. Cl.
CPC .......... *H04L 9/3247* (2013.01); *H04L 9/3239* (2013.01); *H04L 9/3297* (2013.01); *H04L 43/106* (2013.01); *H04L 63/0428* (2013.01); *H04L 67/06* (2013.01); *H04L 2209/38* (2013.01)

(58) Field of Classification Search
CPC ... H04L 9/3247; H04L 9/3239; H04L 9/3297; H04L 43/106; H04L 63/0428; H04L 67/06; H04L 2209/38
See application file for complete search history.

(56) References Cited

U.S. PATENT DOCUMENTS

| | | | |
|---|---|---|---|
| 2014/0059118 A1* | 2/2014 | Pidady | H04L 67/2814 709/203 |
| 2018/0167808 A1* | 6/2018 | Somaraju | H04L 63/065 |
| 2019/0057379 A1* | 2/2019 | Chalakudi | G06Q 20/38215 |

FOREIGN PATENT DOCUMENTS

| | | |
|---|---|---|
| CN | 107832624 | 3/2018 |
| WO | WO 2018/114585 | 6/2018 |
| WO | WO 2018/203817 | 11/2018 |

OTHER PUBLICATIONS

Extended Search Report for European Patent Application No. 20162204.0, dated Jul. 27, 2020 7 pages.

* cited by examiner

*Primary Examiner* — Arvin Eskandarnia
(74) *Attorney, Agent, or Firm* — Sheridan Ross P.C.

(57) ABSTRACT

Embodiments of the disclosure provide a communication system and method to leverage distributed ledger technology as the basis upon which a trustless method can be deployed to validate file provenance and authenticity, while also supporting a strong form of non-repudiation. In one example, the method includes transferring electronic content from a sending communication device to the receiving communication device via Rich Communication Services. The method includes generating, at the sending communication device, file transfer parameters, identity signature and timestamp that are associated with the transfer of electronic content from the sending communication device. The method then includes causing the identity signature and timestamp to be written as part of a content transfer ledger. The method may also include securely providing the file transfer parameters associated with the transfer of electronic content from the sending device to one or more receiving communication devices as part of validating the electronic content.

20 Claims, 8 Drawing Sheets

LEDGER-BASED CONFIDENCE MODEL FOR CONTENT TRANSFERS ACROSS A COMMUNICATION NETWORK

FIELD OF THE DISCLOSURE

Embodiments of the present disclosure relate generally to communication methods and confirming content transfers across a communication network.

BACKGROUND

RCS (Rich Communication Services) is a global initiative that promotes the deployment of inter-operator mobile services within an industry ecosystem. It is a communication protocol for use between mobile-carriers, and between phones and mobile-carriers. It is aimed at replacing traditional Short Message Service (SMS) messaging with a next generation text-messaging capability that is richer and can transmit in-call multimedia. RCS was originally created by the GSMA (Groupe Speciale Mobile Association). The emergence of RCS was a response by the mobile operators to combat a competitive situation, whereby "Over the Top" providers were offering high value services over incumbent carrier networks. The RCS feature-set includes: Standalone Messaging, 1-to-1 Chat, Group Chat, File Transfer, Content Sharing, Social Presence Information, Internet Protocol (IP) Voice call, Best Effort Video call, Geolocation Exchange, Audio Messaging, Network based blacklist and Capability Exchange based on Presence or SIP OPTIONS. VoLTE (Voice over Long-Term Evolution) essentially provides the underlying wireless network infrastructure upon which RCS can be deployed.

BRIEF SUMMARY

When mobile users leverage RCS to transfer files and other content to other users (both RCS and non-RCS), recipients increasingly expect to have full confidence in the provenance and authenticity of these files. A recipient will typically expect to have confidence that a file was indeed provided by the legitimate sender/owner. Additionally, it is increasingly important to ensure that the contents of a file have not been infected with some form of malware prior to it being shared with the intended recipient(s). Finally, existing RCS methods lack sufficient support for non-repudiation. For some situations it may be important for an assurance to exist that the user cannot deny having received a file. These limitations not only apply to the transfer of files within a user's home RCS network, but also in a federated manner between different RCS mobile providers.

Embodiments of the present disclosure proposed to leverage distributed ledger technology (e.g., blockchain technology) as the basis upon which a trustless method can be deployed to validate file provenance and authenticity, while also supporting a strong form of non-repudiation. A proposed method is trustless in nature because the RCS users involved in a file transfer have no need to trust a centralized third-party (e.g., a mobile network operator).

Distributed Ledger Technology (DLT) is a type of database that is shared, replicated, and synchronized amongst all members in a network. Specific types of DLT, such as blockchain, typically maintain a continuously growing list of ordered blocks. Participants in the network govern and agree by consensus on the updates to the ledger. No centralized authority is involved. Blockchains typically store mathematical hashes (e.g., SHA-256) of transactional data rather than the original transactional information. Hashed transaction records are grouped together to form individual blocks that are immutably/permanently stored on the blockchain. Blocks are inextricably linked together such that even the slightest attempt to tamper with the contents of a previous block will invalidate the hashes in all subsequent blocks. Some DLTs/blockchains support the native ability to execute programs that are known as "Smart Contracts" (Ethereum) or Chaincode (Hyperledger).

Embodiments of the present disclosure propose to leverage DLT/Blockchain technology as the basis upon which a trustless method can be used to confirm file provenance and validate file authenticity as part of existing RCS file transfer methods. Embodiments also inherently support the non-repudiation of file transfers. For instance, it may be important that a user cannot deny having received a file. Additionally, embodiments are defined such that these capabilities can be supported in a federated manner between users from different RCS mobile networks and with non-RCS users.

An element of the present disclosure is the application of DLT/Blockchain technology as an RCS file transfer ledger (RFTL). Although described as a particular type of distributed ledger (e.g., an RCS file transfer ledger), it should be appreciated that the term RFTL or ledger as used herein can correspond to any type of distributed ledger used to track a transfer of any type of content across a communication network using any type of transfer technique (whether RCS or another content transfer protocol). Thus, it should be appreciated that embodiments of the present disclosure are not limited to the use of a particular type of distributed ledger in connection with tracking file transfers via RCS.

In some embodiments, the RFTL can be deployed in a federated manner such that RCS users from different RCS mobile carriers can access the ledger as a method to confirm the provenance and validate the authenticity of any files that they receive from other users. Non-RCS users would also be able to access the ledger and perform these very same operations. The ledger, in some embodiments, may serve as a transparent ledger for use in permanently recording the identity signatures of user files that are being shared. The non-repudiation of file transfers will be supported by permanently recording a timestamp on the ledger for each file transfer transaction. These timestamps can then be referenced at a later point in time if questions arise with regard to the transfer of a given file.

In some embodiments, particular methods can be performed prior to initiating the actual file or electronic data content transfer. The following sequence is intended to illustrate the proposed operation without limiting embodiments of the present disclosure:

(1) Creation of the file Identity Signature. The identity signature, in some embodiments, may correspond to a cryptographically signed hash of the original file. Creation of the file's identity signature may involve execution of a mathematical hashing function (e.g., SHA-256) on the input file. The output from this hashing operation may correspond to a fixed-length hexadecimal string called the message digest. The message digest may uniquely correspond to the sending user's input file. If some tampering occurred with the file after hashing, detection would be very easy as it would no longer be possible to create the same message digest from the input file. The second step of this process may include cryptographically signing the message digest by using the sending user's private key. The process of signing a message digest essentially establishes a binding between the message digest and sending user. The output from this signing operation may represent a unique identity signature for the input file that is inextricably linked to the sending user.

(2) Memorializing the Identity Signature. The identity signature may then be permanently recorded on the RFTL. In this way, recipients of the file can later reference the identity signature to check the file's provenance and validate the file's authenticity.

(3) File Transfer. One of the existing file transfer methods that is supported by RCS would then be used to share the file with identified recipient(s).

(4) Writing the File Transfer Timestamp to the RFTL. Once the sender has received confirmation that the file has been successfully transferred, the sender's communication device creates a timestamp associated with the file transfer and records this onto the RFTL.

(5) Sharing of File Transfer Parameters. The file sender may securely provide all intended file recipients with the parameters to confirm the file's provenance, validate the file's authenticity, and retrieve the file's transfer timestamp. Symmetric key encryption may be used to secure the transmission of parameters from the sender to all recipients. The full list of parameters may include: a) the hashing algorithm that was used to hash the sender's file; b) the DLT/Blockchain address of the file's identity signature; c) the DLT/Blockchain address of the file transfer timestamp; and d) a copy of the sender's public key. These parameters could be pushed via a secure message service to all intended recipients.

(6) Receiving the File. One of the supported RCS methods would be used by recipients to receive the file.

(7) Confirmation of File Provenance and Authenticity. A file recipient can confirm file provenance and validate file authenticity by making use of the file transfer parameters from (5). The file recipient would retrieve the appropriate identity signature from the RFTL by using the DLT/Blockchain address that was shared by the sender. The sender's public key as provided in (5) would then be used to decrypt the identity signature. Once decrypted, the recipient could use the hashing algorithm that was specified by the sender in (5) to hash the file that was received from the sender. A comparison would then be performed between the newly calculated message digest and the message digest that was obtained by decrypting the identity signature. A match would confirm the file's provenance and validate the file's authenticity.

(8) Retrieval of File Transfer Timestamps. RCS users that directly participate in a file transfer operation (e.g., as either a sender or recipient) can determine the timestamp of that file transfer. The DLT/Blockchain address of the timestamp as recorded on the RFTL was provided to each recipient as per (5).

In some embodiments, data privacy can be considered in connection with implementing an RFTL. Adequate safeguards can be considered within the proposed disclosure to ensure that data privacy is preserved for RCS users. As an example, only the RCS users who were involved in a given file transfer (e.g., sender and intended recipients or actual recipients) will be granted access to the relevant file transfer parameters as per (5). Personal data that is associated with RCS users may not be recorded onto the RFTL to address data privacy concerns.

It is anticipated that the proposed disclosure can be realized through suitable client-level implementations for the RCS mobile device in conjunction with a DLT/Blockchain implementation for the RFTL. Incremental client-level functionality would support the following operations: a) Create file identity signatures as per (1) above; b) Write identity signatures to the RFTL (DLT/Blockchain) as per (2) above; c) Writing the File Transfer Timestamp to the RFTL as per (4) above; d) Assemble the file transfer parameters as per (5) above; e) Push the file transfer parameters to all intended file recipients as per (5) above; f) Confirmation of file provenance and authenticity as per (7) above; and g) Retrieving file transfer timestamp(s) as per (8) above.

It should be appreciated that embodiments of the present disclosure can provide a federated method for RCS users from different mobile carriers to independently confirm the provenance and authenticity of transferred files.

Although standards-based methods have been defined within RCS to support the secure transmission of session data between RCS users, no explicit method exists to confirm the provenance and authenticity of a file that has been transferred between RCS users.

It is, therefore, one aspect of the present disclosure to provide a decentralized, transparent, and immutable method based on DLT/blockchain technology that provides a confidence model (e.g., provenance, authenticity, non-repudiation) for file transfers within RCS and other file transfer methods.

One aspect of the present disclosure provides a communication system that includes:
  a communications interface;
  a processor coupled to the communications interface; and
  a computer readable medium coupled with the processor, the computer readable medium comprising processor-executable instructions that include:
    instructions that send electronic content via the communications interface to a receiving communication device;
    instructions that generate a timestamp that is associated with the sending of electronic content;
    instructions that cause the timestamp to be written as an electronic record in a content transfer ledger; and
    instructions that provide file transfer parameters associated with the electronic content to the receiving communication device, wherein the file transfer parameters enable the receiving communication device to retrieve the timestamp from the content transfer ledger as part of validating the electronic content.

Another aspect of the present disclosure provides a non-transitory computer readable medium comprising instructions stored therein which, when executed by a processor, the instructions including:
  instructions that send electronic content to a receiving communication device via a communication network;
  instructions that generate a timestamp that is associated with the sending of electronic content;
  instructions that cause the timestamp to be written as an electronic record in a content transfer ledger; and
  instructions that provide file transfer parameters associated with the electronic content to the receiving communication device, wherein the file transfer parameters enable the receiving communication device to retrieve the timestamp from the content transfer ledger as part of validating a provenance and authenticity of the electronic content.

Another aspect of the present disclosure provides a method that includes:
  transferring electronic content from a sending communication device;
  generating, at the sending communication device, a timestamp that is associated with the transfer of electronic content from the sending communication device;

causing the timestamp to be written as an electronic record in computer memory as part of a content transfer ledger; and providing file transfer parameters associated with the transfer of electronic content from the sending device to one or more receiving communication devices, wherein the file transfer parameters enable the one or more receiving communication devices to retrieve the timestamp from the content transfer ledger as part of validating the electronic content.

Figure 1:
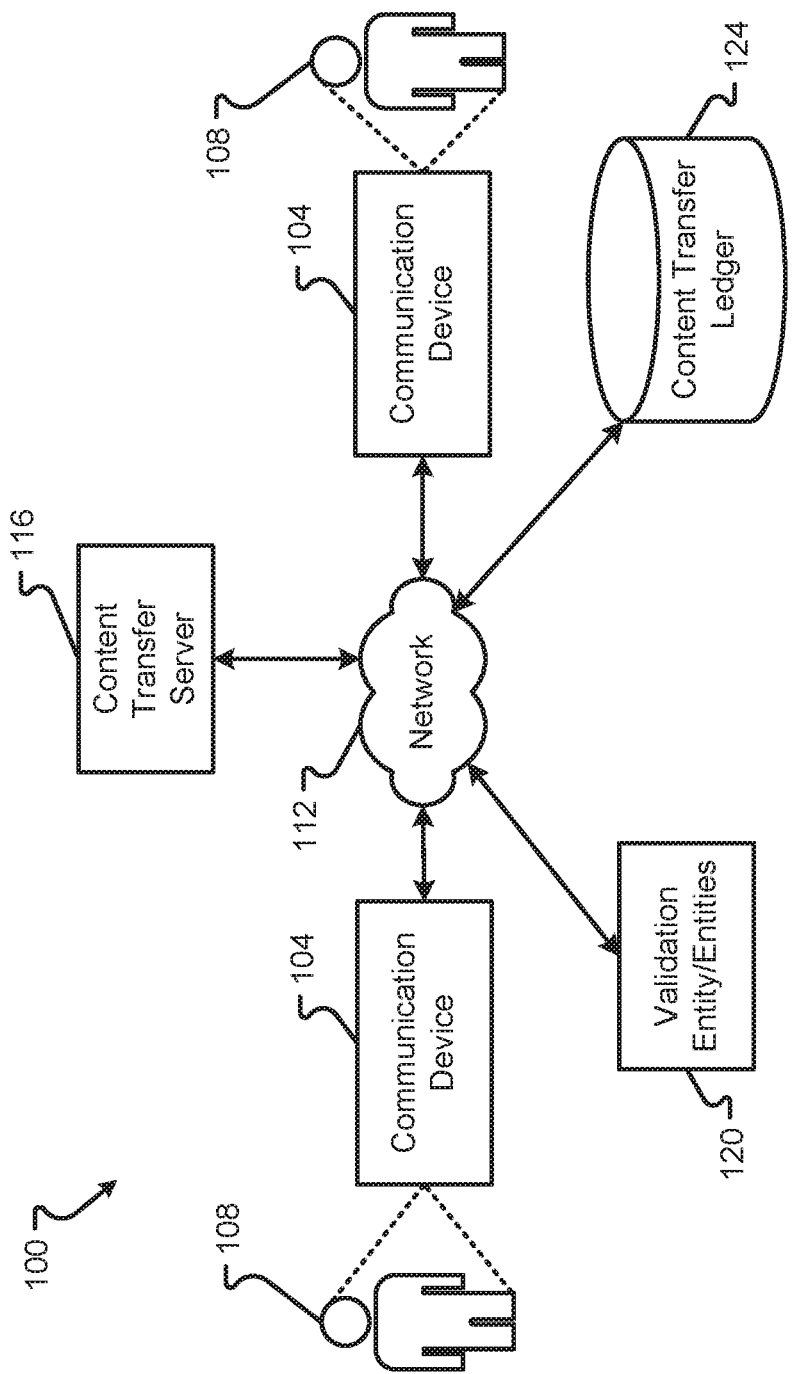
FIG. 1 is a block diagram depicting a communication system in accordance with at least some embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments of the disclosure provide systems and methods for persona-based presentation services, either from a mobile network core or directly from an application operating on a communication device being carried by a caller (calling party) or called party associated with a call. While the flowcharts will be discussed and illustrated in relation to a particular sequence of events, it should be appreciated that changes, additions, and omissions to this sequence can occur without materially affecting the operation of the disclosed embodiments, configuration, and aspects.

With reference now to FIG. 1, an illustrative communication system 100 will be described in accordance with at least some embodiments of the present disclosure. As shown in FIG. 1, the system 100 may include a number of communication devices 104 in communication with one another via a communication network 112. In one non-limiting embodiment, the communication devices 104 may correspond to mobile communication devices (e.g., smartphones, tablets, wearable devices, etc.) that are carried by users 108. As a non-limiting example, the communication devices 104 may be in communication with one another through one or more mobile networks, that may be operated by one or more mobile network operators (MNOs). Accordingly, the network 112 may include a cellular or other wireless network and the communication devices 104 can include smartphones, tablets, laptop computers, wearable devices, or any other portable electronic device configured to communicate over the network 112. It should be understood that while only two devices 104 are illustrated here for the sake of simplicity, any number of devices of different types may be connected with the network 112 at any given time. Furthermore, the communication devices 104 may be carried by RCS users that belong to a common MNO, by RCS users that belong to different MNOs, and/or by one or more non-RCS users.

The network 112 can also include an Internet Protocol (IP) Multimedia Subsystem (IMS) framework providing Internet and/or other data services to the communication devices 104 over the network 112. Generally speaking, the network 112 can utilize Session Initiation Protocol (SIP) and/or leverage other Internet Engineering Task Force (IETF) standard protocols to provide any number of IP multimedia services including but not limited to Voice over IP (VoIP) calling, video, media streaming, web access, RCS functions, file transfer functions, etc. Alternatively or additionally, the network 112 may include a distributed computing network such as the Internet or some other packet-based communication network.

The communication system 100 may further include one or more content transfer servers 116 and one or more validation entities 120 that are also in communication with the network 112. The system 100 is further shown to include a content transfer ledger 124, which may correspond to an RFTL as described herein. Although depicted as a centralized ledger 124, it should be appreciated that the content transfer ledger 124 may actually be distributed among a plurality of memory devices residing on multiple different communication devices 104 and/or devices of a validation entity 120. In other words, the ledger 124 may correspond to a distributed ledger 124 that is structured according to known distributed ledger structures, such as a Blockchain ledger.

The validation entities 120 may correspond to other communication devices 104 and/or servers that include a processor and memory used to validate ledger entries prior to committing such entries to the ledger 124. The validation entities 120 may correspond to communication devices 104 that are participants to a distributed ledger network that results in the creation of the content transfer ledger 124. As such, the validation entities 120 may include components similar to a communication device 104 and may be useable by a user 108 or may include components similar to a server.

In some embodiments, functionality of the content transfer server 116 may be provided by one or multiple servers that are in communication with the network 112. As a more specific example, the content transfer server(s) 116 may provide one or both communication devices 104 with RCS capabilities or other electronic content transfer capabilities.

Figure 2:
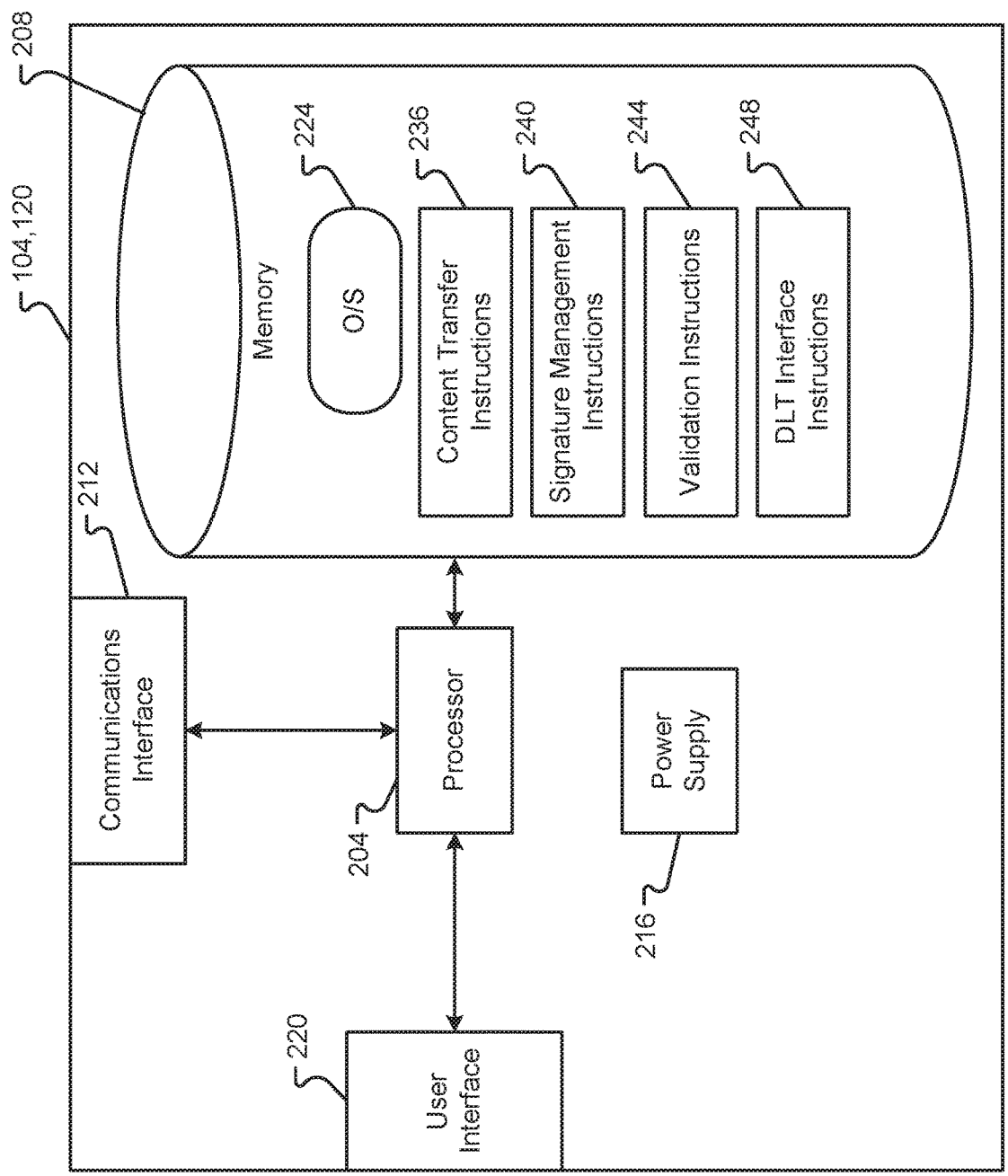
FIG. 2 is a block diagram depicting details of a user device or validation entity in accordance with at least some embodiments of the present disclosure.

With reference now to FIG. 2, additional details of a communication device 104 and/or validation entity 120 will be described in accordance with at least some embodiments of the present disclosure. Although the devices 104, 120 are referred to generally as communication devices, it should be appreciated that the devices 104, 120 may correspond to mobile communication devices, wearable communication devices, computers, laptops, tablets, Personal Digital Assistants (PDAs), etc.

The communication device 104, 120 is shown to include a processor 204, memory 208, a communication interface 212, a power supply 216, and a user interface 220. In some embodiments, all of the components of communication device 104, 120 are provided within a common device housing and are connected via a one or multiple circuit boards.

The processor 204 may correspond to one or multiple processing circuits. In some embodiments, the processor 204 may include a microprocessor, an Integrated Circuit (IC) chip, an ASIC, or the like. The processor 204 may be configured with a plurality of logic circuits or circuit elements that enable the processor 204 to execute one or more instructions or instruction sets maintained in memory 208. Alternatively or additionally, the processor 204 may be configured to execute instructions for operating the communications interface 212 and/or user interface 220. As an example, the processor 204 may be configured to execute one or more drivers that are specifically provided for the communications interface 212 and/or the user interface 220.

The memory 208 is shown to be in communication with the processor 204. The memory 208 may include any type or combination of computer memory devices. Non-limiting examples of memory 208 include flash memory, volatile memory, non-volatile memory, RAM, NVRAM, SRAM, ROM, EEPROM, etc. As can be appreciated, the types of devices used for memory 208 may depend upon the nature and type of data stored in memory 208.

In the depicted embodiment, the memory 208 includes one or a plurality of finite/closed-ended instruction sets that are executable by the processor 204. Non-limiting examples of instruction sets that may be provided in memory 208 include an operating system (O/S) 224, content transfer instructions 236, signature management instructions 240, validation instructions 244, and ledger interface instructions 248.

A user 108 of the device 104, 120 may be enabled to access and utilize the various instructions 236, 240, 244, 248 via use of the O/S 224. Examples of an O/S 224 include Apple iOS, Android OS, Blackberry OS, Windows OS, Palm OS, Open WebOS, etc. In some embodiments, the O/S 224 provides a display of icons that are presented via the user interface 220. Some or all of the icons may be selectable by the user of the communication device 104, 120 to access routines or features provided by instructions 236, 240, 244, 248. In some embodiments, each discrete set of instructions (e.g., an application) has a specific icon associated therewith that is presented via a home screen of the O/S 224. When that specific icon is selected by a user, the user interface 220 of the communication device 104, 120 may present specific data and graphics associated with the application.

The content transfer instructions 236, when executed by the processor 204, may enable the communication device 104, 120 to operate as a sender of electronic content (e.g., an electronic file), as a recipient of electronic content, or combinations thereof. In some embodiments, the content transfer instructions 236 may enable the communication device 104, 120 to send or receive electronic content across the communication network 112. The content transfer instructions 236 may also enable the communication device 104, 120 to store electronic content received from another communication device. The content transfer instructions 236 may also enable the communication device 104, 120 to send/receive/retrieve electronic content using any type of content transfer method, such as RCS. The content transfer instructions 236, in some embodiments, may enable the communication device 104, 120 to communicate with the content transfer server 116 for purposes of enabling the exchange of electronic content.

The signature management instructions 240, when executed by the processor 204, may enable the communication device 104, 120 to generate identity signatures for content to be transferred across the communication network 112. Alternatively or additionally, the signature management instructions 240 may enable the communication device 104, 120 to generate a message digest based on transfer parameters received from a sender for purposes of comparing the message digest to an identity signature stored in the ledger 124. The validation instruction 244, when executed by the processor 204, may operate in concert with the signature management instructions 240 to compare identity signatures and message digests for purposes of file validation.

The ledger interface instructions 248, when executed by the processor 204, may enable the communication device 104, 120 to interact with the ledger 124 or act as a participant to the network in which the distributed ledger 124 is maintained. In some embodiments, the ledger interface instructions 248 may enable the communication device 104, 120 to write entries to the ledger 124, retrieve or read entries written to the ledger 124, and/or validate entries prior to committing the entries to the ledger 124. The ledger interface instructions 248 may also enable the communication device 104, 120 to store a portion of the ledger 124 in memory 208.

The communications interface 212 provides hardware and drivers that enable the device 104, 120 to connect with the network 112, receive communications from the network 112, and/or provide communications to the network 112 for delivery to another communication device. In some embodiments, the communications interface 212 includes a wired and/or wireless network adapter. Non-limiting examples of a communications interface 212 include an antenna and associated driver (e.g., a WiFi or 802.11N antenna and/or driver), an Ethernet card and/or driver, a serial data port (e.g., a USB port) and/or driver, a Bluetooth or BLE antenna and/or driver, an NFC antenna and/or driver, or any other type of device that facilitates inter-device communications. The communications interface 212 may receive one or more data packets or messages from the communication network 112 and extract data therefrom. The data extracted from the received data packets or messages may be provided to the processor 204 where the data can subsequently be processed using instructions stored in memory 208.

The power supply 216 may correspond to an internal power source and/or adapter for connection with an external power source. In the example of an internal power source, the power supply 216 may correspond to a battery or cell of batteries used to power the various other components of the device 104, 120. Alternatively or additionally, the power supply 216 may include a power converter or power conditioner that enables power received from an external source (e.g., a 120V AC power source) to be converted into useable DC power that can be supplied to the various components of the communication device 104, 120.

The user interface 220 may correspond to a user input device, a user output device, a combination user input/output device, or a number of such devices. As an example of a user input device, the user interface 220 may include a microphone, a button, a physical switch, a camera, an accelerometer, or the like. As an example of a user output device, the user interface 220 may include a speaker, a light, a display screen, a tactile output device (e.g., a haptic feedback device), or the like. As an example of a combination user input/output device, the user interface 220 may include a touch-sensitive display screen that has one or more areas thereof capable of presenting a Graphical User Interface (GUI) element and, if touched or selected by a user, recognizing that the GUI element has been selected by the user.

Figure 3:
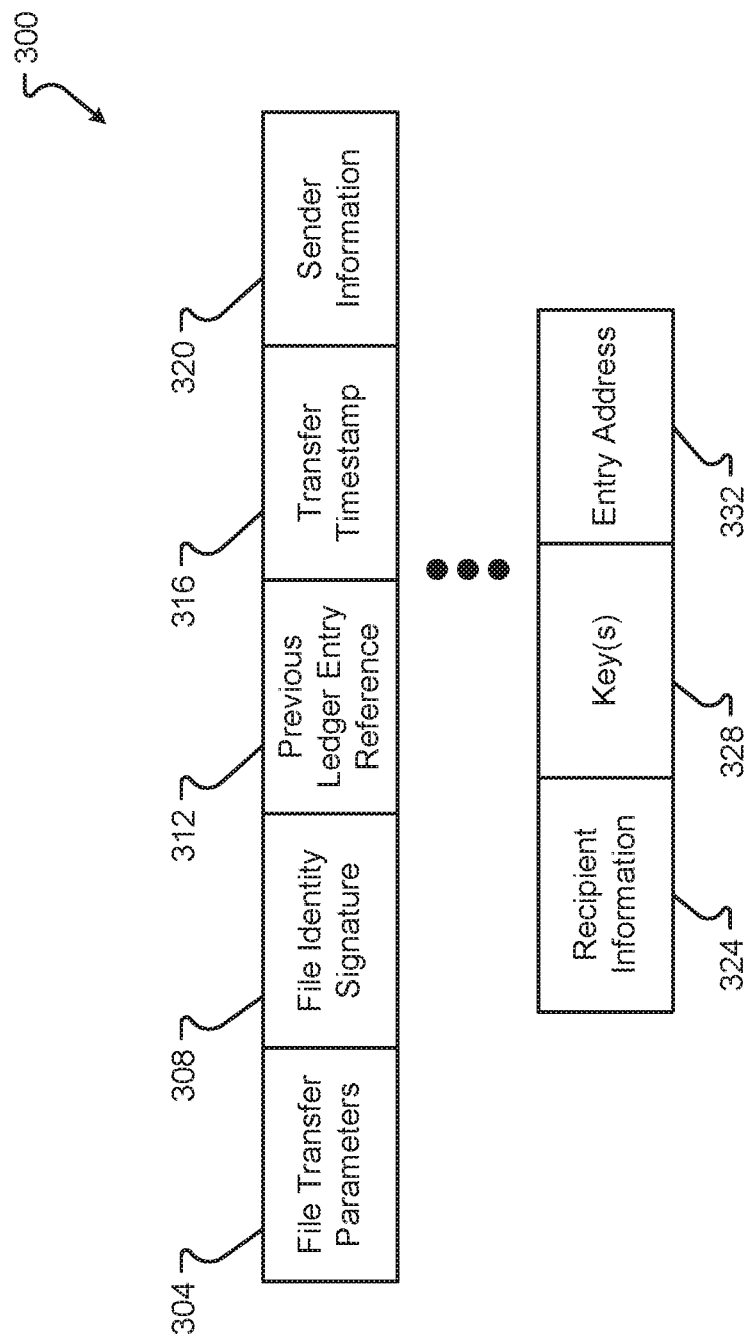
FIG. 3 is a block diagram depicting a data structure in accordance with at least some embodiments of the present disclosure.

With reference now to FIG. 3, additional details of a data structure 300 that can be used as part of the ledger 124 will be described in accordance with at least some embodiments of the present disclosure. The data structure 300 is shown to include a number of data fields, which may be stored in any number of possible computer memory devices. For instance, the fields of the data structure 300 may be stored in memory of a user device 104, 120, in memory of a server, or in combinations thereof. For instance, some of the data fields may be maintained in the user device 104, 120 whereas others of the data fields may be maintained in servers. It may also be possible that instance of a data field are maintained in both the device 104, 120 and a server.

The illustrative data fields that may be included in the data structure 300 include, without limitation, file transfer parameters field 304, an identity signature field 308, a previous ledger entry reference field 312, a transfer timestamp field 316, a sender information field 320, a recipient information field 324, a key(s) field 328, and an entry address field 332. The fields of a particular entry in the data structure 300 may all be stored in a common memory device or in different memory devices, depending upon the nature of the ledger 124.

The file transfer parameters field 304 may be used to store file transfer parameters for a particular file transfer event. In some embodiments, the file transfer parameters field 304 may be used to store information such as: a) the hashing algorithm that was used to hash the sender's file; b) the DLT/Blockchain address of the file's identity signature; c) the DLT/Blockchain address of the file transfer timestamp; and d) a copy of the sender's public key.

The file identity signature field 308 may be used to store the file identity signature associated with a particular file transfer event. The file identity signature field 308 may be used to store a fixed-length hexadecimal string, which may correspond to the message digest. The message digest may uniquely correspond to the sending user's input file. The message digest may be stored in the clear or in an encrypted manner in the file identity signature field 308. A communication device 104 may utilize the signature management instructions 240 to generate the message digest or identity signature. The process of signing a message digest essentially establishes a binding between the message digest and sending user. The output from this signing operation may represent a unique identity signature for the input file that is inextricably linked to the sending user and that is stored in the field 308.

The previous ledger entry reference field 312 may be used to store information that references an address or content of a previous entry in the ledger 124. The previous ledger entry reference field 312 may store a pointer to an address in the ledger 124 or may store other information that references a previous entry in the ledger 124 that has already been validated by a validation entity 120. The previous ledger entry reference 312 may be used to ensure that entries written to the ledger 124 are immutable records.

The transfer timestamp field 316 may correspond to a data field used to store timestamp information or any other data that describes a day/month/year/time that a particular content event occurred. In some embodiments, the transfer timestamp field 316 may store a single timestamp generated by a communication device 104 that transferred an electronic file to one or more recipient communication devices 104. The timestamp may be generated based on a clock of the processor 204 operating in the sending communication device 104.

The sender information field 320 and recipient information field 324 may be used to store information that describes a user 108 and/or communication device 104 of a user 108 that was involved in a transfer or electronic content, such as an electronic file. In some embodiments, the fields 320, 324 may be used to store IP addresses of communication devices 104 used to transfer content. Alternatively or additionally, the fields 320, 324 may store names or aliases of users 108 involved in a content transfer event. Adequate safeguards can be considered to ensure that data privacy is preserved for users. As an example, only the users who were involved in a given file transfer (e.g., sender and intended recipients or actual recipients) will be granted access to the relevant file transfer parameters. Also, personal data that is associated with users may not be recorded onto the ledger to address data privacy concerns. In some embodiments, the sender information field 320 may store information for a single sender of electronic content whereas the recipient information field 324 may store information for multiple recipients (e.g., intended recipients or actual recipients).

The key(s) field 328 may be used to store one or more keys that can be used to encrypt or decrypt data stored in other data fields of the data structure 300. As a non-limiting example, the key(s) field 328 may be used to store a public encryption key that is used by a recipient to decrypt a message digest. The public encryption key may belong to an asymmetric key pair in which the other key in the key pair is a private encryption key used by the sender to encrypt the message digest as part of generating the identity signature.

The entry address field 332 may correspond to a data field that stores an address or reference to a memory address. The particular data stored in the entry address field 332 may include a memory device used to store the ledger entry as well as other information used to locate the memory device among participants in the ledger network. For instance, the entry address field may identify a communication device 104, 120, memory device within a communication device 104, 120, and/or a particular location within memory. Alternatively or additionally, the entry address field 332 may store an address or name of an entry in the ledger 124.

With reference now to FIGS. 4-8, various communication methods will be described in accordance with at least some embodiments of the present disclosure. The methods may be performed by the processor 204 of a communication device 104, 120, a processor of a server, or by a combination thereof. While methods may be described in connection with an electronic transfer of a particular type (e.g., an electronic file transfer event) between two communication devices, it should be appreciated that the methods can be performed in connection with an electronic content transfer event in which more than two communication devices are involved and/or in which content other than an electronic file is transferred. It should also be appreciated that any of the methods depicted and described herein may be performed in connection with RCS functions or in connection with non-RCS functions. It should also be appreciated that any of the methods or steps of methods can be performed in any order or in combination with steps from other methods.

Figure 4:
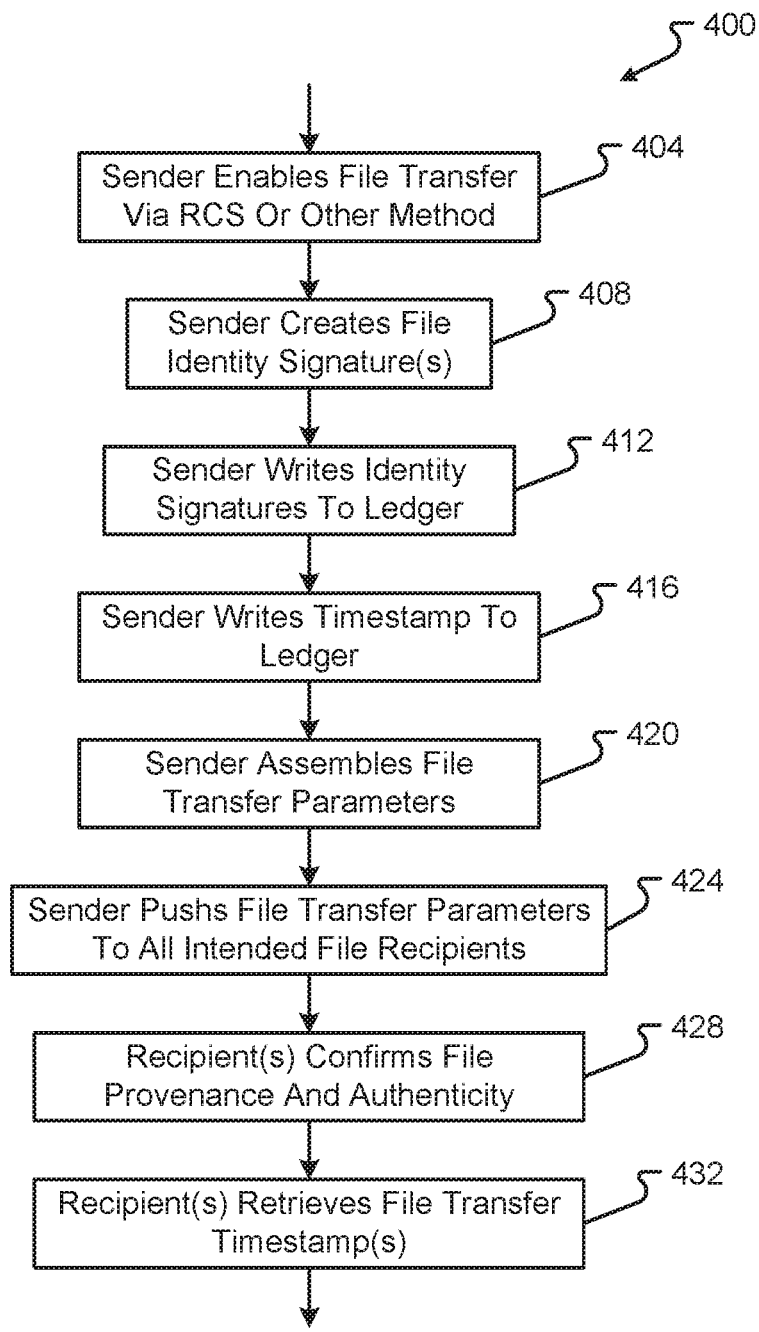
FIG. 4 is a flow diagram depicting a first communication method in accordance with at least some embodiments of the present disclosure.

Referring initially to FIG. 4, a first communication method 400 will be described in accordance with at least some embodiments of the present disclosure. The method 400 begins by enabling a file transfer capability between communication devices 104 (step 404). In some embodiments, the file transfer may be facilitated by RCS or any other electronic content transfer method.

The method continues with the sending communication device 104 creating a file identity signature (step 408). In some embodiments, the sending communication device 104 creates the file identity signature using some or all of the steps depicted and described in FIG. 5. As an example, the file identity signature may be creating by applying a cryptographic hashing function on the electronic content (e.g., electronic file) to be sent by the sending communication device 104.

The method further continues with the sending communication device 104 causing the file identity signature to be written to the ledger 124 (step 412). In some embodiments, the file identity signature may need to be validated by one or more validation entities 120 prior to committing the file identity signature to the ledger 124. The file identity signature may be written to the ledger 124 before or after the electronic file has been sent to the desired recipients.

The method then continues with the sending communication device 104 generating a timestamp that is associated with the file transfer event and writing the timestamp to the ledger 124 (step 416). In some embodiments, the timestamp may correspond to a time that the sending communication device 104 generated the file identity signature, to a time that the file transfer occurred, or a combination thereof. The writing of the timestamp to the ledger 124 may also require validation by one or more validation entities 120 prior to committing the timestamp to the ledger 124. The timestamp may be written to the ledger 124 before or after the electronic file is transferred to the recipients.

The method continues with the sending communication device 104 assembling file transfer parameters for transmission to the intended recipients of the file and/or for writing to the ledger 124 (step 420). The file transfer parameters that may be assembled by the sending communication device 104 include one or more of the following: a) the hashing algorithm that was used to hash the sender's file; b) the DLT/Blockchain address of the file's identity signature; c) the DLT/Blockchain address of the file transfer timestamp; and d) a copy of the sender's public key. Once assembled, the file transfer parameters may be pushed to one, some, or all of the intended file recipients (step 424). Alternatively or additionally, the file transfer parameters may be written to the ledger 124 and then instructions for retrieving the parameters from the ledger 124 may be pushed to one, some, or all of the intended file recipients. This particular step may involve the sending communication device 104 generating and sending one or more secure messages (e.g., SMS messages) to intended recipient communication devices 104.

The recipient communication devices 104 can then use the file transfer parameters and any other information received from the sending communication device 104 to confirm the provenance and authenticity of the transferred electronic files (step 428). In some embodiments, the recipient communication devices 104 may also retrieve a file transfer timestamp from the ledger 124 as part of confirming the file provenance and authenticity (step 432). Steps 428 and 432 may be performed prior to opening a particular electronic file (e.g., to ensure the file has not been altered or infected with a virus) or after an electronic file has been opened (e.g., to confirm receipt of the desired file and/or validate that receipt occurred).

Figure 5:
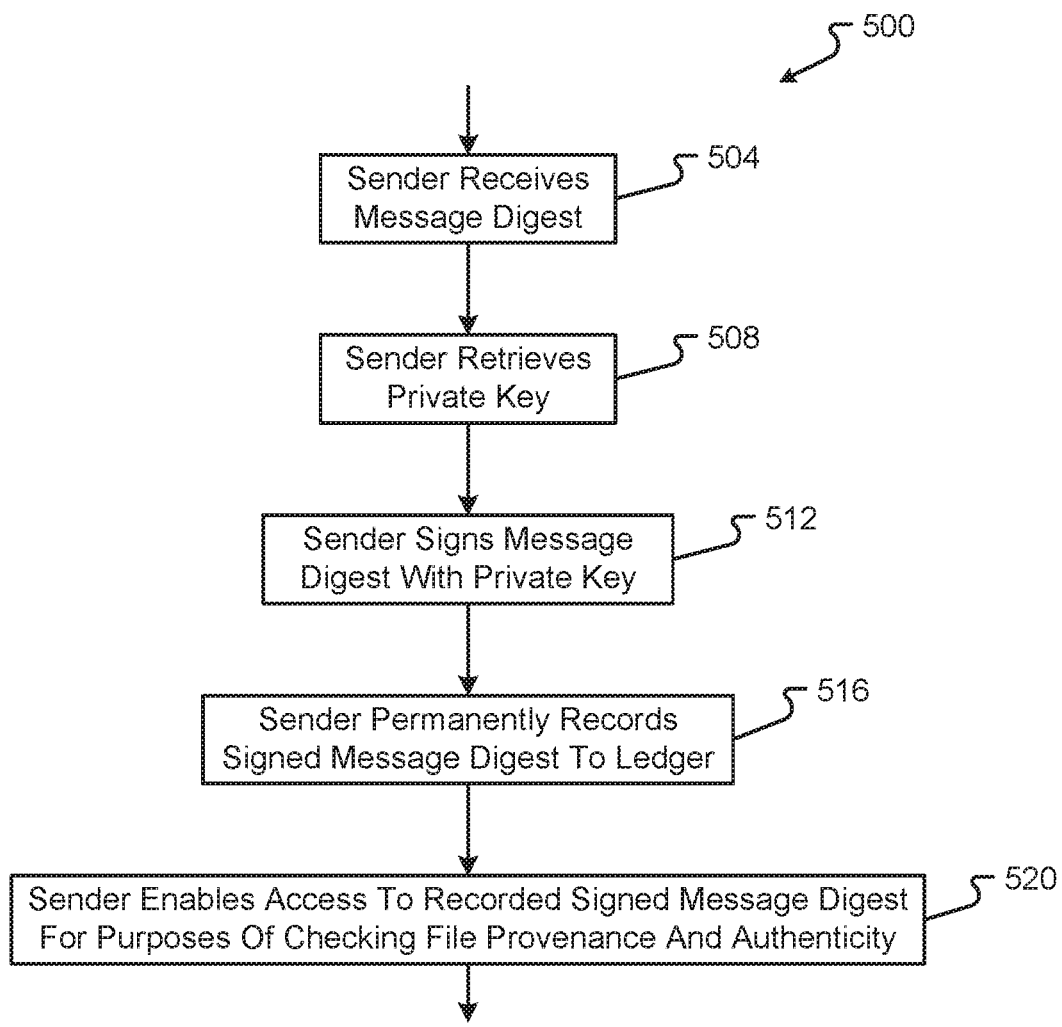
FIG. 5 is a flow diagram depicting a second communication method in accordance with at least some embodiments of the present disclosure.

With reference now to FIG. 5, additional details of a second communication method 500 will be described in accordance with at least some embodiments of the present disclosure. The method 500 may include one or several steps used to create a file identity signature and make the file identity signature available to other communication devices 104 for purposes of validating file provenance and authenticity. The method 500 begins with a processor 204 of a sending communication device 104 receiving a message digest (step 504). In some embodiments, a message digest uniquely corresponds to a sending user's input file and may correspond to an output of a hashing operation. As a non-limiting example, the message digest may correspond to a fixed-length hexadecimal string.

The method 500 continues with the processor 204 of the sending communication device 104 retrieving a private encryption key from memory 208 (step 508). In some embodiments, the private encryption key may be solely stored in the memory 208 of the sending communication device 104 and may be unique among any other keys used by the communication device 104. The communication device 104 then uses the private key to sign the message digest (step 512). The process of signing a message digest may establish a binding between the message digest and the sending communication device 104. This output (e.g., the signed message digest) may then be written to the ledger 124 (step 516). In some embodiments, the signed message digest may be permanently written to the ledger 124 only after being validated by some other validation entity 120 that participates in the network of the distributed ledger 124. Writing the signed message digest to the ledger 124 enables the signed message digest, which may be referred to as an identity signature, to be accessed by other communication devices 104 for purposes of checking file provenance and/or authenticity (step 520).

Figure 6:
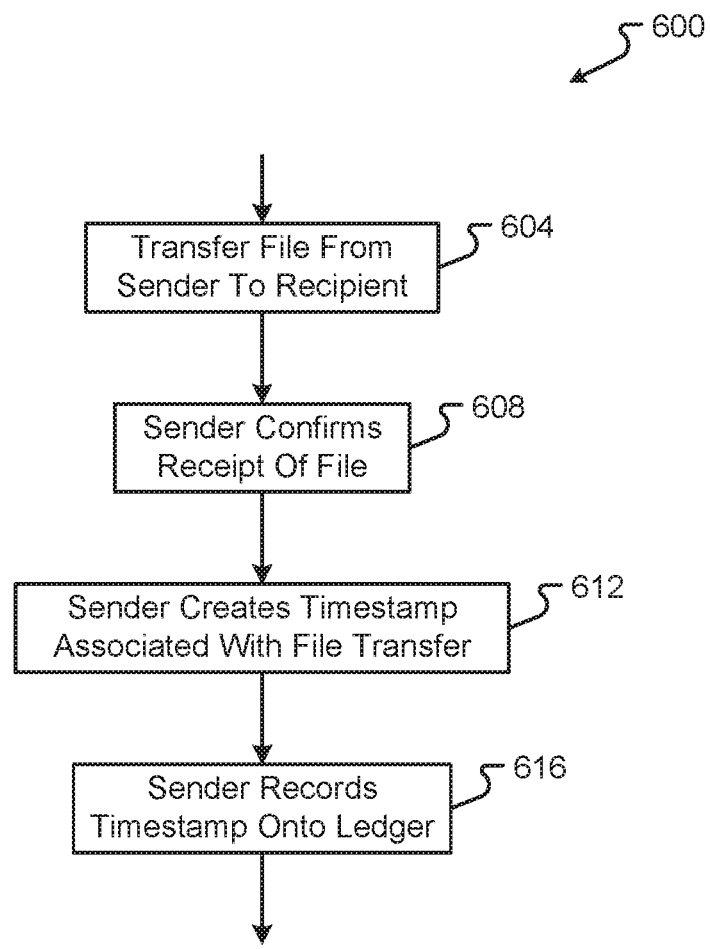
FIG. 6 is a flow diagram depicting a third communication method in accordance with at least some embodiments of the present disclosure.

With reference now to FIG. 6, details of a third communication method 600 will be described in accordance with at least some embodiments of the present disclosure. The method 600 may include one or several steps for generating and writing a file transfer timestamp to a distributed ledger 124. The method 600 begins with a sending communication device 104 determining that it will transfer an electronic file to a recipient communication device 104 (step 604). This determination may be made in response to one or more inputs from a user 108 of the device 104. The method may continue with the sending communication device 104 sending the electronic file to the recipient communication device 104 via any desirable file transfer method. One example of a suitable electronic file transfer method includes the use of RCS.

Once the electronic file has been sent, the sending communication device 104 will wait until the recipient communication device 104 confirms receipt of the electronic file (step 608). In some embodiments, the method 600 does not continue until receipt is confirmed. Once file receipt is confirmed at the sender, the method 600 continues with the processor 204 of the sending communication device 104 creating a timestamp that is uniquely associated with the file transfer event (step 612). This timestamp may then be recorded onto the ledger 124 (step 616). In some embodiments, the timestamp is stored as part of an electronic entry in the ledger 124 that is associated with the file transfer event (e.g., with other data describing the file transfer event).

Figure 7:
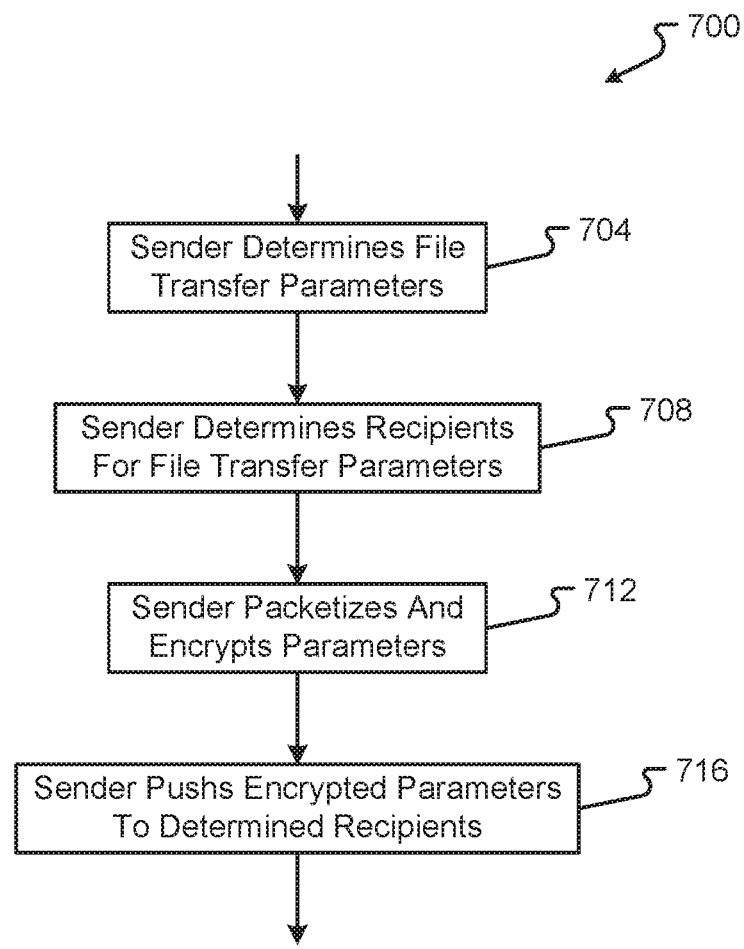
FIG. 7 is a flow diagram depicting a fourth communication method in accordance with at least some embodiments of the present disclosure.

With reference now to FIG. 7, a fourth method 700 will be described in accordance with at least some embodiments of the present disclosure. The method 700 may include one or several steps for sharing file transfer parameters with receiving communication devices 104. The method 700 begins with the sending communication device 104 determining file transfer parameters to share with one or more receiving communication devices 104 (step 704). In some embodiments, the sending communication device 104 may determine to share the file transfer parameters with all intended file recipients such that all recipients are able to confirm the file's provenance, validate the file's authenticity, and retrieve the file's transfer timestamp. The method continues with the sending communication device 104 determining the recipients for the file transfer parameters (step 708). As noted above, the recipients for the file transfer parameters may be exactly the same as the list of recipients for the file or may be a subset of the recipients of the file.

The sending communication device 104 continues by packetizing the file transfer parameters and encrypting the packet(s) with one or more encryption keys (step 712). In some embodiments, the encrypted packets of data are pushed to the recipients identified in step 708 (step 716). In some embodiments, the parameters are pushed to the recipients using a secure message service, such as SMS.

Figure 8:
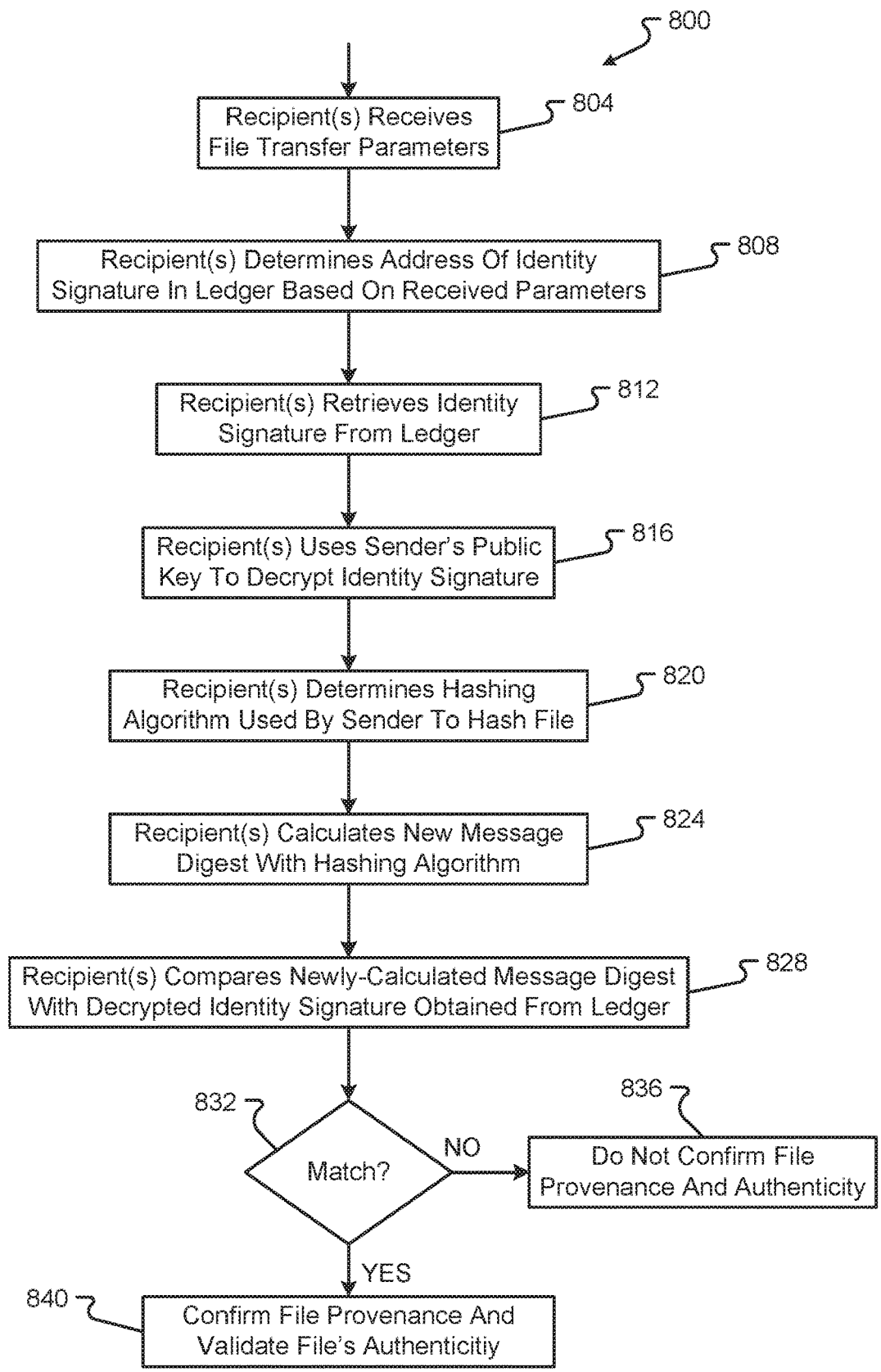
FIG. 8 is a flow diagram depicting a fifth communication method in accordance with at least some embodiments of the present disclosure.

With reference now to FIG. 8, a fifth method 800 will be described in accordance with at least some embodiments of the present disclosure. The method 800 may include one or several steps for confirming file provenance and/or validating a file's authenticity. The method 800 begins when a receiving communication device 104 receives file transfer parameters for a sending communication device 104 (step 804). This step may occur before or after an electronic file has been sent from the sending communication device 104 to the receiving communication device 104 using any type of known file transfer process, such as RCS.

The method continues with the receiving communication device 104 determining an address or location of an identity signature in the ledger 124 for the received electronic files (step 808). In some embodiments, the address or location of the identity signature is received as part of the file transfer parameters shared by the sending communication device 104. The sending communication device 104 then retrieves the identity signature from the appropriate location in the ledger 124 (step 812). The receiving communication device 104 then uses the sender's public key to decrypt the identity signature retrieved from the ledger 124 (step 816). In some embodiments, the sender's public key corresponds to a public key pair associated with the sender's private key.

The method 800 then continues with the receiving communication device 104 determining the hashing algorithm that was used by the sender when calculating the identity signature (step 820). This information may have been provided to the receiving communication device 104 as part of the file transfer parameters shared by the sending communication device 104. The method 800 then continues with the receiving communication device 104 calculating a new message digest with the hashing algorithm determined in step 820 (step 824). The newly-calculated message digest is then compared with the decrypted identity signature obtained from the ledger 124 (step 828). This comparison may be performed by the receiving communication device 104 executing the signature management instructions 240 and/or validation instructions 244.

Thereafter, the method 800 continues with the receiving communication device 104 determining whether the newly-calculated message digest matched with the decrypted identity signature (step 832). If the query of step 832 is answered negatively, then the receiving communication device 104 may not confirm the provenance and/or authenticity of the file (step 836). In some embodiments, the receiving communication device 104 may avoid opening or downloading the file received from the sending communication device 104 so as to avoid receiving a computer virus. If the query of step 832 is answered positively, then the receiving communication device 104 may confirm the file's provenance and validate the file's authenticity and, in response thereto open or download the file received from the sending communication device 104 (step 840).

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A communication system, comprising:
   a communications interface;
   a processor coupled to the communications interface; and
   a computer readable medium coupled with the processor, the computer readable medium comprising processor-executable instructions that include:
   instructions that send electronic content via the communications interface to a receiving communication device;
   instructions that generate a timestamp that is associated with the sending of the electronic content;
   instructions that cause the timestamp to be written as an electronic record in a content transfer ledger;
   instructions that provide file transfer parameters associated with the electronic content to the receiving communication device, wherein the file transfer parameters enable the receiving communication device to retrieve the timestamp from the content transfer ledger as part of validating the electronic content; and
   instructions that enable, after the electronic content is validated by the receiving communication device, a message digest to be accessed by a second communication device.

2. The communication system of claim 1, wherein the instructions further include:
   instructions that retrieve an encryption key;
   instructions that apply a cryptographic operation to the electronic content to generate the message digest;
   instructions that sign the message digest with the encryption key to generate an identity signature for the electronic content; and
   instructions that cause the identity signature to be written to the content transfer ledger.

3. The communication system of claim 2, wherein the encryption key comprises a private encryption key and wherein the cryptographic operation comprises a cryptographic hash.

4. The communication system of claim 3, wherein the instructions that provide the file transfer parameters further provide the receiving communication device with information that describes the cryptographic hash.

5. The communication system of claim 1, wherein the instructions further include:
   instructions that provide a public key to the receiving communication device as part of the file transfer parameters.

6. The communication system of claim 1, wherein the instructions further include:
   instructions that packetize the file transfer parameters;
   instructions that encrypt the packetized file transfer parameters; and
   instructions that push the encrypted packetized file transfer parameters to the receiving communication device.

7. The communication system of claim 1, wherein the electronic content comprises an electronic file and wherein the electronic file is transferred to the receiving communication device via Rich Communication Services (RCS).

8. The communication system of claim 1, wherein the content transfer ledger comprises a distributed ledger and wherein the electronic record is written to the content transfer ledger with reference to a previously-written electronic record thereby causing the electronic record to become an immutable entry in the content transfer ledger.

9. A non-transitory computer readable medium comprising instructions stored therein which, when executed by a processor, the instructions comprising:
   instructions that send electronic content to a receiving communication device via a communication network;
   instructions that generate a timestamp that is associated with the sending of the electronic content;
   instructions that cause the timestamp to be written as an electronic record in a content transfer ledger;
   instructions that provide file transfer parameters associated with the electronic content to the receiving communication device, wherein the file transfer parameters enable the receiving communication device to retrieve the timestamp from the content transfer ledger as part of validating a provenance and authenticity of the electronic content; and
   instructions that enable, after the electronic content is validated by the receiving communication device, a message digest to be accessed by a second communication device.

10. The non-transitory computer readable medium of claim 9, wherein the instructions further comprise:
    instructions that retrieve an encryption key;

instructions that apply a cryptographic operation to the electronic content to generate the message digest;

instructions that sign the message digest with the encryption key to generate an identity signature for the electronic content; and instructions that cause the identity signature to be written to the content transfer ledger.

11. The non-transitory computer readable medium of claim 10, wherein the encryption key comprises a private encryption key and wherein the cryptographic operation comprises a cryptographic hash.

12. The non-transitory computer readable medium of claim 11, wherein the instructions that provide the file transfer parameters further provide the receiving communication device with information that describes the cryptographic hash.

13. The non-transitory computer readable medium of claim 9, wherein the instructions further comprise:

instructions that provide a public key to the receiving communication device as part of the file transfer parameters.

14. The non-transitory computer readable medium of claim 9, wherein the electronic content comprises an electronic file and wherein the electronic file is transferred to the receiving communication device via Rich Communication Services (RCS).

15. A method, comprising:

transferring electronic content from a sending communication device;

generating, at the sending communication device, a timestamp that is associated with the transfer of the electronic content from the sending communication device;

causing the timestamp to be written as an electronic record in computer memory as part of a content transfer ledger; and providing file transfer parameters associated with the transfer of the electronic content from the sending communication device to one or more receiving communication devices, wherein the file transfer parameters enable the one or more receiving communication devices to retrieve the timestamp from the content transfer ledger as part of validating the electronic content; and enabling, after the electronic content is validated by at least one communication device of the one or more receiving communication devices, a message digest to be accessed by a third communication device.

16. The method of claim 15, further comprising:

retrieving an encryption key;

applying a cryptographic operation to the electronic content to generate the message digest;

signing the message digest with the encryption key to generate an identity signature for the electronic content; and causing the identity signature to be written to the content transfer ledger.

17. The method of claim 16, wherein the encryption key comprises a private encryption key, wherein the cryptographic operation comprises a cryptographic hash, and wherein the method further comprises:

providing a public key to the one or more receiving communication devices as part of the file transfer parameters; and providing information that describes the cryptographic hash to the one or more receiving communication devices as part of the file transfer parameters.

18. The method of claim 15, further comprising:

packetizing the file transfer parameters at the sending communication device;

encrypting the packetized file transfer parameters at the sending communication device; and pushing the encrypted packetized file transfer parameters to the one or more receiving communication devices.

19. The method of claim 15, wherein the electronic content comprises an electronic file and wherein the electronic file is transferred to the one or more receiving communication devices via Rich Communication Services (RCS).

20. The method of claim 15, wherein the content transfer ledger comprises a distributed ledger, the method further comprising:

validating content of the electronic record prior to causing the electronic record to be written to the content transfer ledger; and causing the electronic record to reference a previously-written electronic record in the content transfer ledger thereby causing the electronic record to become an immutable entry in the content transfer ledger.

* * * * *